United States Patent
Hadorn et al.

(10) Patent No.: US 11,381,508 B2
(45) Date of Patent: Jul. 5, 2022

(54) SYSTEM AND METHOD FOR ACCELERATING OR DECELERATING A DATA TRANSPORT NETWORK PROTOCOL BASED ON REAL TIME TRANSPORT NETWORK CONGESTION CONDITIONS

(71) Applicant: Opanga Networks, Inc., Seattle, WA (US)

(72) Inventors: Ben Hadorn, Seattle, WA (US); John Burnette, Seattle, WA (US); Dave Gibbons, Seattle, WA (US); Ethan Nordness, Seattle, WA (US)

(73) Assignee: Opanga Networks, Inc., Bellevue, WA (US)

( * ) Notice: Subject to any disclaimer, the term of this patent is extended or adjusted under 35 U.S.C. 154(b) by 0 days.

(21) Appl. No.: 16/201,944

(22) Filed: Nov. 27, 2018

(65) Prior Publication Data
US 2019/0166052 A1    May 30, 2019

Related U.S. Application Data

(60) Provisional application No. 62/590,921, filed on Nov. 27, 2017.

(51) Int. Cl.
*H04L 29/08* (2006.01)
*H04L 47/20* (2022.01)
(Continued)

(52) U.S. Cl.
CPC .............. *H04L 47/20* (2013.01); *H04L 47/11* (2013.01); *H04L 47/193* (2013.01);
(Continued)

(58) Field of Classification Search
CPC ....... H04L 47/20; H04L 47/11; H04L 47/193; H04L 47/196; H04L 47/2416;
(Continued)

(56) References Cited

U.S. PATENT DOCUMENTS

2004/0146056 A1*  7/2004  Martin .................... H04L 45/12
                                                  370/465
2012/0140624 A1*  6/2012  Denman ............. H04L 43/0882
                                                  370/230.1
(Continued)

FOREIGN PATENT DOCUMENTS

WO      2016091298 A1    6/2016
WO      2016156425 A1    10/2016

OTHER PUBLICATIONS

PCT International Search Report for Application No. PCT/US2018/062660, dated Mar. 12, 2019.
European Search Report and Written Opinion dated Jul. 23, 2021 in related European Application No. 18880885.1.

*Primary Examiner* — Edan Orgad
*Assistant Examiner* — Malick A Sohrab (57) ABSTRACT

A method is performed by a computing device in a data transport network. The computing device receives congestion-related information corresponding to current conditions of a portion of the network. The computing device determines whether a data transport session has a fair-share protocol. When the data transport session has the fair-share protocol, determining a congestion policy for the data transport session, and applying, using the congestion-related information, the congestion policy to the data transport session.

19 Claims, 5 Drawing Sheets

(51) Int. Cl.
*H04L 47/11* (2022.01)
*H04L 47/193* (2022.01)
*H04L 47/19* (2022.01)
*H04L 47/2416* (2022.01)
*H04L 47/2466* (2022.01)
*H04L 47/25* (2022.01)
*H04L 47/629* (2022.01)
*H04W 28/02* (2009.01)

(52) U.S. Cl.
CPC ........ *H04L 47/196* (2013.01); *H04L 47/2416* (2013.01); *H04L 47/2466* (2013.01); *H04L 47/25* (2013.01); *H04L 47/629* (2013.01); *H04W 28/0231* (2013.01); *H04W 28/0289* (2013.01)

(58) Field of Classification Search
CPC ... H04L 47/2466; H04L 47/25; H04L 47/629; H04W 28/0231; H04W 28/0289
See application file for complete search history.

(56) References Cited

U.S. PATENT DOCUMENTS

| | | | | |
|---|---|---|---|---|
| 2012/0257529 | A1* | 10/2012 | Ehara | H04L 12/66 370/252 |
| 2014/0226475 | A1* | 8/2014 | Stewart | H04L 47/20 370/230.1 |
| 2014/0269319 | A1* | 9/2014 | DeCusatis | H04L 47/12 370/236 |
| 2015/0043345 | A1* | 2/2015 | Testicioglu | H04L 47/24 370/232 |
| 2016/0113031 | A1* | 4/2016 | Sun | H04W 72/1268 370/336 |
| 2016/0149993 | A1* | 5/2016 | Fieau | H04L 45/02 709/218 |
| 2016/0234256 | A1* | 8/2016 | Roach | H04L 63/20 |
| 2016/0380898 | A1* | 12/2016 | Englund | H04L 47/27 370/235 |
| 2017/0293561 | A1* | 10/2017 | Dwiel | G06F 12/0886 |
| 2017/0325120 | A1 | 11/2017 | Szilagyi et al. | |
| 2018/0048581 | A1* | 2/2018 | Suga | H04L 67/14 |

* cited by examiner

SYSTEM AND METHOD FOR ACCELERATING OR DECELERATING A DATA TRANSPORT NETWORK PROTOCOL BASED ON REAL TIME TRANSPORT NETWORK CONGESTION CONDITIONS

CROSS REFERENCE TO RELATED APPLICATIONS

This application claims the benefit of U.S. Provisional Patent Application No. 62/590,921, filed on Nov. 27, 2017, which is incorporated by reference herein for all purposes.

BACKGROUND

Data transport protocols may implement a fair-share component to their protocol stack which either increases or reduces data packet transmit rate based on transport measurements (i.e. data loss, latency, throughput). Fair-share implementations can vary between different transport protocols (for example, Transmission Control protocol (TCP), User Datagram Protocol (UDP), and the like) but the goal is the same: to give each competing data transfer equal access of the shared data transport environment. For example, if there is a 10 Mbps transport environment and 5 unique data transport connections, the fair-share component would attempt to give each data transfer session ~2 Mbps, thus providing a fair network environment.

Current TCP Optimization solutions attempt to accelerate the time it takes for a data transfer session to reach its maximum throughput capability through several different mechanisms. One such implementation is to start data transfer at a higher rate and accept a higher risk of data loss, thereby accelerating packet transport and increasing throughput.

Some existing solutions may attempt to resolve transport network topographical challenges present in wide area networks (WAN) such as mobile networks. Networks like mobile access can be thought of as two or more different transport networks that are interconnected. Some existing TCP Optimization solutions might bridge these two networks by implementing separate fair-share algorithms for portions (i.e., each subnetwork) of the network.

A radio access network (RAN) and the Internet have fundamental differences that are problematic for standard data transport protocols. For example, the RAN is typically a higher latency network with a larger variability in round trip time (RTT) measurements (e.g. 60-500 ms), whereas the Internet (i.e., wired network such as Wide Area Network) provides more consistent and generally lower RTT measurement (e.g. 40-60 ms). The conditions in which RAN-using data transfers exist is highly variable and can cause the data transfer session to be continuously adjusting the data transport rate based on variables that in the end, have no impact to shared network "fair-share" policies. RTT, for example, is a poor way to measure the congestion of the shared data transport network in the scenario explained above where one part of the network is by design a high and variable latency network.

Some congestion control processes may drop packets to signal the presence of congestion. However, in networks such as RANs, packets may be dropped for a variety of reasons, such as due to temporary interference. Misinterpreting a packet dropped because of temporary interference as indicating congestion can cause underutilization of a RAN's capacity and reduce data transport performance.

Therefore, a need exists for a method of providing competing data transfers equal access in a shared data transport environment that includes networks with different operational characterizes, such as a shared data transport environment including both a RAN and the Internet.

BRIEF SUMMARY OF THE DISCLOSURE

According to an embodiment, a method for accelerating or decelerating data transport sessions will apply to any transport protocol that implements fair-share policies. In this embodiment, a congestion aware transport optimization technology may receive congestion metrics from one or more other network nodes (such as a RAN eNodeB) or derive end-to-end network congestion metrics based its own internal fair-share transport policies.

A congestion aware transport acceleration or deceleration technology is used to adapt to varying network topographies (i.e. Radio Access Networks) mitigating the use of poorly measured or misconstrued network measurements (for example, RTT latency) to apply fair-share congestion avoidance based on real-time transport network link measured congestion levels, where congestion refers to cross-traffic contention on a shared link.

Using real-time transport network congestion metrics from one or many network nodes, a transport optimization node could become congestion aware and make fair-share determinations based on the current congestion level of the transport link. One use case could be to increase the transport speed of data sessions on uncongested transport more quickly than today's transport protocols would allow. Other transport sessions may exist on congested transport links that should have their transport speed decreased and maintained at a lower speed to alleviate the congestion and provide a more stable fair-share for all competing transport sessions.

According to various embodiments of the present disclosure, a method is performed by a computing device in a data transport network. The computing device receives congestion-related information corresponding to current conditions of a portion of the network and determines whether a data transport session has a fair-share protocol. When the data transport session has the fair-share protocol, the computer device determines a congestion policy for the data transport session, and applies, using the congestion-related information, the congestion policy to the data transport session.

In an embodiment, determining the congestion policy for the data transport session comprises determining the congestion policy according to a transport level protocol of the data transport session.

In an embodiment, determining the congestion policy for the data transport session comprises determining the congestion policy according to an endpoint of the data transport session.

In an embodiment, determining the congestion policy for the data transport session comprises determining the congestion policy according to a subnetwork including the endpoint of the data transport session.

In an embodiment, determining the congestion policy for the data transport session comprises: determining an application using the data transport session; and determining the congestion policy according to the application.

In an embodiment, applying the congestion policy to the data transport session comprises providing an indication of congestion to an endpoint of the data transport session. The indication is to adjust a congestion window of the data transport session. Providing the indication of congestion to the endpoint of the data transport session is performed by altering one or more bits in a Transport layer header of a message of the data transport session.

In an embodiment, receiving, by the computing device, the congestion-related information comprises: receiving, by the computing device, congestion-related information from a network node, wherein the computing device is outside the path carrying the data transport session, and performs the method by communicating with devices in the data transport network that are in the path carrying the data transport session.

In an embodiment, the network node is a base station of a Radio Access Network (RAN) being used to communicate the transport data session, wherein the congestion-related information includes one or more of information selected from the group consisting of throughput information, jitter information, number of competing concurrent flows information, a number of users of the RAN, real-time throughput information for one or more users of the RAN, a Channel Quality Indicator (CQI) of the RAN, information on a delay due to excess resource demand, and priority information regarding a data transport session of the RAN.

In an embodiment, the data transport session is one of a plurality of session in a same network, wherein the congestion policy includes prioritizing the data transport session from if the data transport session has been transmitting for less time, or transmitted less bytes, or both, than one of the other sessions in the same network.

In an embodiment, the congestion policy prioritizing the data transport session is implemented when the computing device a network transmission delay over the same network due to cross-traffic contention from the plurality of sessions.

In an embodiment, a system, comprises a memory storing non-transitory program commands; and a processor, wherein when the processor executes the program commands, the processor: receives congestion-related information corresponding to current conditions of a portion of the network; determines whether a data transport session has a fair-share protocol; and when the data transport session has the fair-share protocol: determines a congestion policy for the data transport session, and applies, using the congestion-related information, the congestion policy to the data transport session.

In an embodiment, determining the congestion policy for the data transport session comprises determining the congestion policy according to a transport level protocol of the data transport session.

In an embodiment, determining the congestion policy for the data transport session comprises determining the congestion policy according to an endpoint of the data transport session.

In an embodiment, determining the congestion policy for the data transport session comprises determining the congestion policy according to a subnetwork including the endpoint of the data transport session.

In an embodiment, determining the congestion policy for the data transport session comprises: determining an application using the data transport session; and determining the congestion policy according to the application.

In an embodiment, applying the congestion policy to the data transport session comprises providing an indication of congestion to an endpoint of the data transport session. The indication is to adjust a congestion window of the data transport session. Providing the indication of congestion to the endpoint of the data transport session is performed by altering one or more bits in a Transport layer header of a message of the data transport session.

DETAILED DESCRIPTION

Embodiments of the present disclosure relate to accelerating or decelerating data transport sessions. The acceleration and deceleration of the data transport session may be used to maintain fair-share data access in the presence of network congestion, wherein the network congestion refers to cross-traffic contention on a shared link.

For example, when a coverage area is determined to be congested, network resources may be fairly distributed to terminals operating data flows in the coverage areas. The coverage area is determined to be congested, for example, when it has limited surplus capacity.

Figure 1:
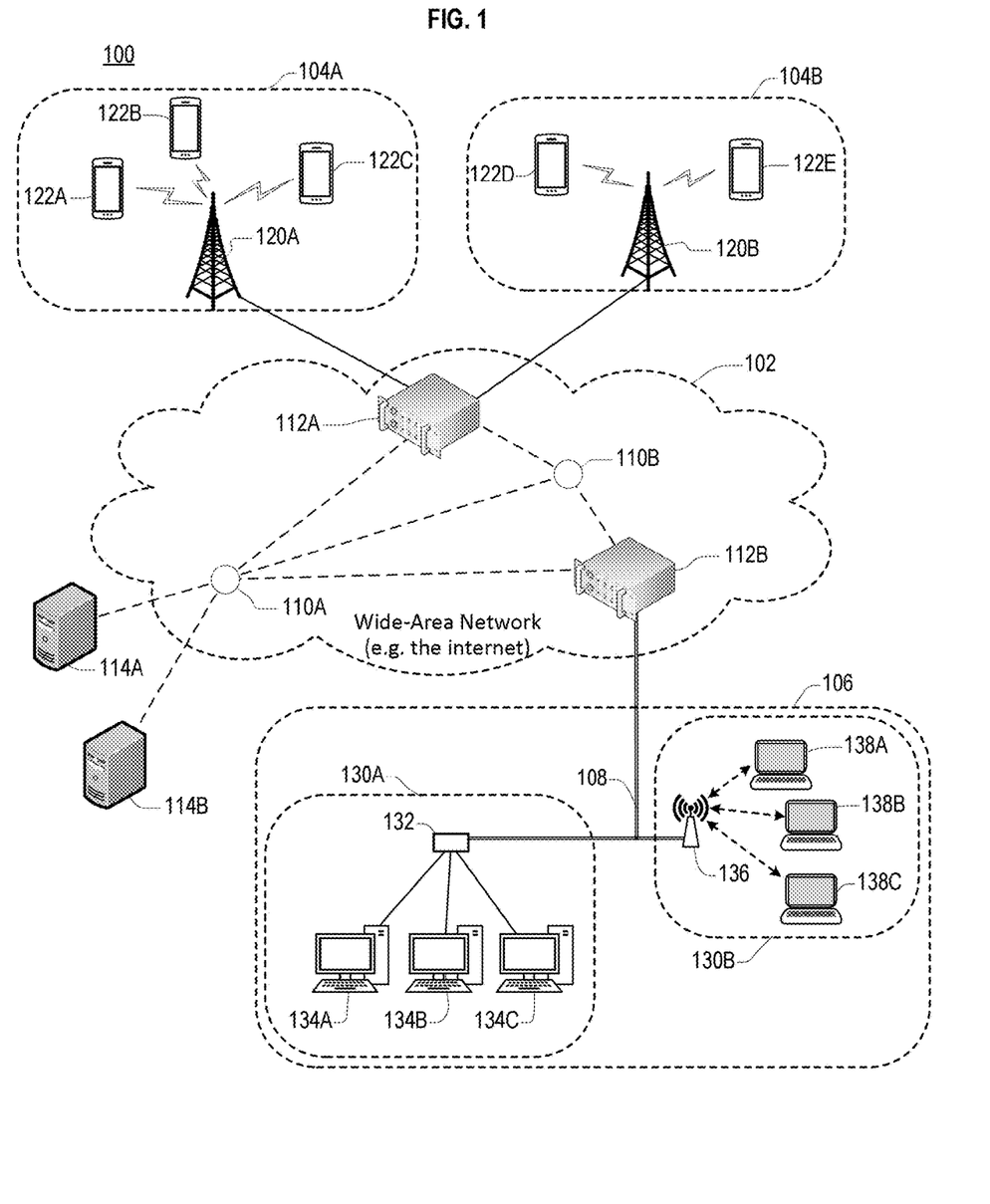
FIG. 1 illustrates a communication network according to an embodiment.

FIG. 1 illustrates a communication network 100 according to an embodiment. The network 100 includes a Wide-Area Network (WAN) 102 (for example, the Internet), a plurality of cellular Radio Access Networks (RANs) 104A and 104B, a cable or DSL based Internet Access Network (IAN) 106, and a plurality of servers 114A and 114B attached to the WAN 102. However, embodiments are not limited thereto.

The WAN 102 includes a plurality of routers 110A and 110B, a first gateway 112A, and a second gateway 112B all in direct or indirect communication with each other. The routers 110A and 110B operate at a networking layer of a protocol stack (for example, at the Internet Protocol (IP) layer of a TCP/IP Protocol stack) to route packets. That is, the routers 110A and 110B perform their functions using information provided in the IP headers of an IP datagram.

The gateways 112A and 112B operate at a transport layer or higher of a protocol stack. For example, the gateways 112A and 112B may operate using information in User Datagram Protocol (UDP) headers, Transmission Control Protocol (TCP) headers, and/or other transport layer protocol headers, the transport layer protocol headers being encapsulated in the IP data of IP datagrams.

The first gateway 112A may also function as an aggregation point for the RANs 104A and 104B. Furthermore, the first gateway 112A may provide transport management and monitoring and control functions for the RANs 104A and 104B. The first gateway 112A may communicate with the RANs 104A and 104B through a backhaul network.

In an embodiment, the first gateway 112A provides transport optimization for the RANs 104A and 104B, including real-time optimization of fair-share transport protocols in response to congestion on the RANs 104A and 104B. The first gateway 112A may receive real-time information on traffic in each of the RANs 104A and 104B, such as information on throughput, latency, round-trip time, jitter, number of competing concurrent flows, and so on, and may use the real-time information to perform the real-time optimization of the fair-share transport protocols.

Similarly, the second gateway 112B may function as an aggregation point for the IAN 106, provide transport management, monitoring, and control functions for the IAN 106, and provides transport optimization for the IAN 106, including real-time optimization of fair-share transport protocols in response to congestion on the IAN 106.

The first RAN 104A includes a first base station 120A and a plurality of User Equipment (UEs) 122A, 122B, and 122C wirelessly communicating with the first base station 120A over a shared radio-frequency (RF) resource. The second RAN 104B includes a second base station 120B and a plurality of UEs 122D and 122E wirelessly communicating with the second base station 120B over the shared RF resource. The UEs 122A to 122E communicate with the WAN 102 via the base stations 120A and 120B and the first gateway 112A. The base stations 120A and 120B may be Evolved Node Bs (eNodeBs), Base Transceiver Stations (BTSs), or the like, and the UEs 122A to 122E may be cellular phones, wireless hotspots, computers with cellular modems, or the like, but embodiments are not limited thereto.

The IAN 106 includes a shared wired resource 108 (for example, a coaxial cable, fiber optic cable, or the like, or combinations thereof) connecting a plurality of Local Area Networks (LANs) 130A and 130B to the second gateway 112B. Devices on the LANs 130A and 130B may compete for the finite bandwidth of the shared wired resource 108.

A first LAN 130A may include a combined modem and router 132 for connecting devices on the first LAN 130A to the WAN 102 through the shared wired resource 108. A plurality of networked devices 134A, 134B, and 134C may be connected to the combined modem and router 132 by, for example, 1000Base-T Ethernet over copper wires.

A second LAN 130B may include a combined modem, router, and wireless Access Point (AP) 136 for connecting devices on the second LAN 130B to the WAN 102 through the shared wired resource 108. The second LAN 130B may therefore be a Wireless LAN (WLAN). A plurality of stations (STAs) 138A, 138B, and 138C may be wireless connected to the combined modem, router, and AP 136 using, for example, Wi-Fi™ technology using a shared radio-frequency resource.

First and second servers 114A and 114B may provide services to devices connected to the WAN 102. Examples of services that may be provided include cloud computing, cloud storage, social networking, streaming video, and the like. Each of the first and second servers 114A and 114B may deliver a particular type of content. For example, the first server 114A may be a dedicated video-on-demand server, in which case traffic coming from the server 114A may be presumed to be video traffic.

Figure 2:
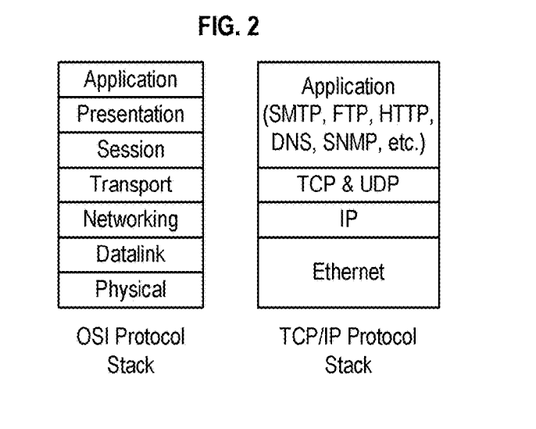
FIG. 2 illustrates communication protocol stacks pertinent to some embodiments.

FIG. 2 illustrates communication protocol stacks pertinent to some embodiments. On the left is the Open System Interconnect (OSI) protocol stack model (hereinafter, OSI stack), having 7 layers, and a Transmission Control Protocol/Internet Protocol (TCP/IP) protocol stack model (hereinafter, TCP/IP stack) having four layers. The lowest two levels of the OSI stack (Physical and Datalink) correspond to the lowest level (Ethernet) of the TCP/IP stack, and the highest three layers of the OSI stack (Application, Presentation, and Session) correspond to the Application layer of the TCP/IP stack.

The Physical layer of the OSI stack deals with the physical connectors and electrical specification of signals, and corresponds to the medium over which the digital signals are transmitted (e.g., twisted pair, coaxial cable, optical fiber, wireless, et cetera).

The Datalink layer of the OSI stack handles the transformation of raw bits of the physical layer to and from logical structured packets for data (that is, frames) and for transferring frames from one host to another.

The Ethernet layer of the TCP/IP stack provides the functionality of both the Physical and Datalink layers of the OSI stack.

The Networking layer of the OSI stack handles transferring data between systems in a network (that is, end-to-end transfers) using network-layer addresses of machines to designate destinations and sources. Routers operate at this level to manage and direct traffic. The IP level of the TCP/IP stack provides this functionality.

The Transport layer of the OSI stack transfers data between source and destination processes running on systems. Generally, two connection modes are recognized, connection-oriented and connectionless.

Connection-oriented mode establishes a dedicated virtual circuit and offers various grades of guaranteed delivery, ensuring that data received is identical to data transmitted. The TCP of the TCP/IP stack corresponds to a connection-oriented Transport layer mode.

Connectionless mode provides only best-effort service without the built-in ability to correct errors, which includes complete loss of data without notifying the data source of the failure. No logical connection, and no persistent state of the transaction exists between the endpoints, lending the connectionless mode low overhead and potentially better real-time performance for timing-critical applications such as voice and video transmissions. The UDP of the TCP/IP stack correspond to a connectionless Transport layer mode.

The Session layer of the OSI stack controls the connections between computers. It may establish, manage, and terminate connections between local and remote applications, and provide for full-duplex, half-duplex, or simplex operation, among other functions. The Presentation layer of the OSI stack defines and encrypts/decrypts data types from the application layer, and may include protocols such as JPEG, MPEG, and GIF. The Application layer of the OSI stack keeps track of how each application talks to another application, and may link destination and source addresses to specific applications. The Application layer of the TCP/IP stack corresponds to the functionality of the Session, Presentation, and Application layers of the OSI stack.

Figure 3:
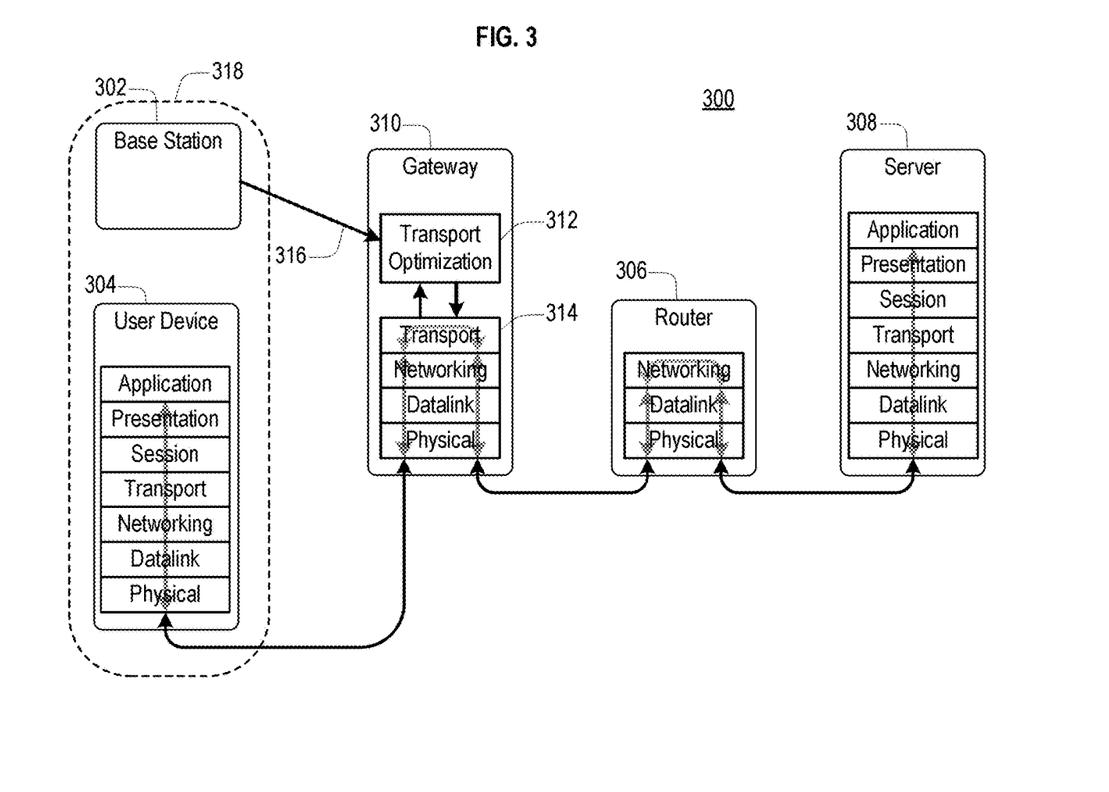
FIG. 3 illustrates a data transfer in a communication network according to an embodiment.

FIG. 3 illustrates a data transfer in a communication network 300 according to an embodiment. In the illustrative example of FIG. 3, information flows between a UE 304 and a server 308 through a router 306 and a gateway 310, but embodiments are not limited thereto, and typically, the UE 304 communicates with the server 308 through at least one gateway 308 and a plurality of routers 306.

In FIG. 3, a base station 302 of a RAN 318 provides wireless communications to the UE 304, and provides congestion-related information 316 of the RAN 318 to the gateway 310. In an embodiment, other nodes, e.g., adjacent base stations or nearby UEs, may also provide the congestion-related information provided to the gate way 310; alternatively, the gateway 310 may obtain the congestion-related information from its internal mechanism or process running therein. The congestion-related information 316 may include real-time transport congestion metrics. For example, the base station 302 may be an eNodeB of RAN 318, and may supply congestion metrics related to all of the data transport sessions being served by the eNodeB.

The real-time transport congestion metrics included in the congestion-related information 316 may one or more of a number of users currently sharing the transport network, a real-time throughput of each user; a delay incurred in processing a data packet due to overburdening due to excess resource demand (that is, congestion), a Channel Quality Indicator (CQI) of a radio environment; user information for the origin and destination of the data transport session, and priority levels of data transport sessions. However, embodiments are not limited thereto.

The information flowing from and to the UE 304 may be processed by all seven layers of the OSI stack (or the equivalent TCP/IP layers) in the UE 304, and may be processed by all seven layers of the OSI stack (or the equivalent TCP/IP layers) in the server 308.

In the router 306, the information flowing from and to the UE 304 may only be processed by the bottom three layers the OSI stack (or the Ethernet and IP layers of a TCP/IP stack). For example, the router 306 may process the packets flowing through it using information in the IP headers of the packets without using the information encoded in the IP data of the packets.

In contrast, in the gateway 310, the packets may be processed according to information in headers of the Transport layer 314, which headers are included in the data of the Network layer frames. For example, the gateway 310 may process the packets according to TCP or UDP headers included in the IP data of an IP frame. Furthermore, the gateway 310 may alter the Transport layers 314 headers, and may do so according to the congestion-related information 316.

The gateway 310 may receive congestion-related information 316 from one or more other network nodes, in addition to receiving such from the base station 302.

In an embodiment, the gateway 310 includes a transport optimization process 312 that provides network management functions by interpreting and altering headers in Transport layer 314 in response to the congestion-related information 316. In embodiments, the gateway 310 may perform the network management functions according to transport congestion protocols stored in the gateway 310 or in an external database. The network management functions may be performed on a data transport session basis. The network management functions may include controlling a packet rate (and therefore a bandwidth) used by the data transport session in order to prevent congestion on the network.

In an embodiment, the gateway 310 is part of a border traffic aggregation point connecting the RAN 318 with a WAN. For example, in a 3rd Generation Partnership Project (3GPP) standard mobile network, the aggregate point is part of the sGi-LAN connecting to the Packet Data Network (PDN)-Gateway core element and outwards to the Internet. In another embodiment, the aggregate point is part of a Gi-LAN connecting to a gateway GPRS support node (GGSN)-Gateway and outwards to the Internet. However, in other embodiments, the gateway 310 is located elsewhere.

In an embodiment, a device implementing a congestion aware transport optimization solution such as the transport optimization process 312 could be deployed directly in line with the data transport session, as shown in FIG. 3. In another embodiment, a device implementing the transport optimization process 312 could be out of the path carrying the data transport session, in which case the device may send and receive control messages to and from other network elements to accomplish the desired transport optimization.

In some embodiments, the gateway 310 may be part of a content delivery network serving one or more networks including the RAN 318. According to various embodiments, the gateway 310 may be located at a network node or endpoint between (or including) the UE 304 and the server 308.

In embodiments, the gateway 310 may be located at a base station, a base station controller, or an access point serving one or more user devices including the UE 304.

In an embodiment, the transport optimization process 312 performs the network management function according to an application or type of application associated with the data transport session. For example, when a data transport session is determined to be connection to a dedicated video-on-demand server, the transport optimization process 312 may use a fair-share policy specific to video streams to perform the network management function.

In an embodiment, when the transport optimization process 312 receives no congestion-related information 316 pertinent to a data transport session (such as when no congestion aware transport node exists or a congestion aware transport node is unable to send congestion-related information to other network nodes) then the transport optimization process 312 may implement its own congestion detection method.

Regardless of whether the congestion-related information is delivered from an external node or derived internally, the transport optimization process 312 maintains and updates a cache of congestion information as it relates to diverging paths in the transport network. While data transport sessions may have common aggregation points, there are often diverging paths throughout the network which could constitute different congestion profiles and therefore require distinction by the transport optimization solution.

For data transport sessions that use TCP, the transport optimization process 312 may query a congestion Key Performance Indicator (KPI) cache to find the appropriate starting congestion window sizing, which controls how quickly the data transport session should start sending packets to quickly obtain its fair-share of the transport network resources. As the transport optimization process 312 continues to optimize the data transport session, it is also receiving or deriving updated congestion metrics and continuously updating the data transport session's transmit rate to be commensurate with the level of congestion.

For TCP data transport sessions that exist in congested transport networks, the fair-share window could be held at a rate that is appropriate for the level of congestion. For example, if a 10 Mbps transport link is moderately congested (~50%) by 5 concurrent data transport sessions, the transport optimization process 312 could quickly set the transport throughput to each data transport session's fair-share of the transport networks capability. In contrast, traditional competing TCP data sessions that have not been optimized may increase the congestion on the transport network by continuously trying to increase their transport speed, essentially fighting each other to achieve individual maximum throughput.

In the case of UDP transport protocols that implement a fair-share algorithm as part of their protocol stack (i.e. the Quick UDP Internet Connection (QUIC) protocol) the congestion aware transport optimization process 312 could perform the previously described deceleration technique as an over the top management protocol. When a fair-share UDP data session is established in a congested transport network, the transport optimization process 312 could reduce the rate at which the data transport session is able to transmit, continuously updating the allowed transport rate based on the real-time transport congestion metrics.

Figure 4:
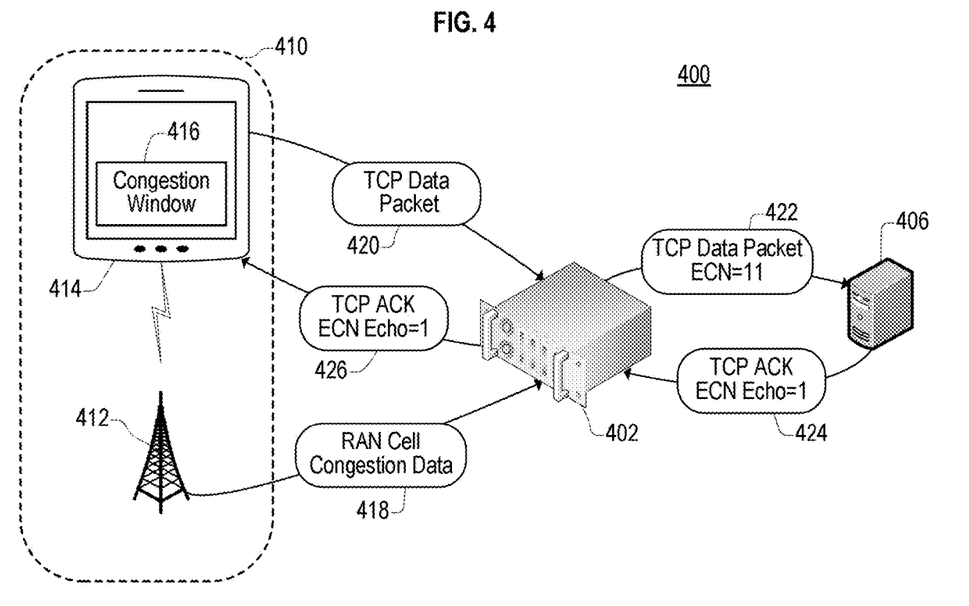
FIG. 4 illustrates operation of a transport optimization system according to an embodiment.

FIG. 4 illustrates operation of a transport optimization system 400 according to an embodiment. The transport optimization system 400 includes a gateway 402, a server 406, and a RAN 410. The RAN 410 includes a base station 412 that provides data communications to a UE 414.

The base station 412 provides congestion-related data 418 for the RAN 410 to the gateway 402. The congestion-related data 418 may include one or more of information on throughput, latency, round-trip time, jitter, distribution of traffic types (such as numbers of short and long packets), and number of competing concurrent flows. In an embodiment, the gateway 402 may add additional information to the received congestion-related data 418, such as congestion information regarding individual links between the gateway 402 and other devices, and congestion information regarding other parts of the network.

The UE 414 may transmit, through the RAN 410, a first TCP Data packet 420 to the gateway 402 as part of a data transport session. The first TCP Data packet 420 is intended for delivery to the server 406. The gateway 402 may determine, using a congestion protocol associated with the data transport session and the congestion-related data 418, that the bandwidth used by the data transport session should be reduced.

In an embodiment, in response to determining that the bandwidth used by the data transport session should be reduced, the gateway 402 modifies the first TCP Data packet 420 by setting Explicit Congestion Notification (ECN) bits in the TCP header to '11' to produce a second TCP data packet 422. The second TCP data packet 422 is then routed to the server 406.

In response to the second TCP data packet 422, the server 406 transmits a first Acknowledgement (ACK) 424 intended for delivery to the UE 414. The first ACK 424 includes an ECN Echo (ECE) bit set to 1.

The gateway forwards the first ACK 424 to the UE 414 as a second ACK 426 that is identical, at the TCP level, to the first TCP Ack 424.

In response to receiving the second TCP ACK 426 having the ECN Echo bit set to 1, the UE 414 reduces a size of a congestion window 416 associated with the data transport session, thus decreasing the packet rate (and therefore the bandwidth) of the data transport session.

Figure 5:
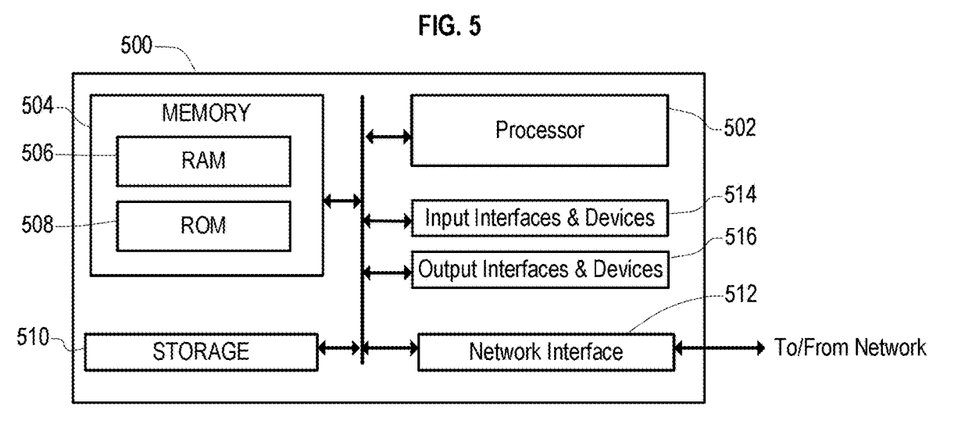
FIG. 5 illustrates a computer system according to an embodiment.

FIG. 5 illustrates a computer system 500, which may be used to implement an embodiment. The computer system 500 may implement an embodiment by, for example, executing computer programming instructions stored in a non-transitory computer readable medium.

The computer system 500 may include one or more of a processor 502, a memory 504, input interfaces and devices 514, output interfaces and devices 516, and a storage 510, each of which communicates with each other through a bus, fabric, or other interconnect technology. The computer system 500 may also include one or more network interfaces 512 coupled to a network. For example, when the computer system 500 is used to implement a router or gateway, the computer system 500 may include a network interface 512 for each physical layer network connection of the computer system 500.

The processor 502 may be a central processing unit (CPU) or a semiconductor device that executes processing instructions stored in the memory 504 and/or the storage 510. The memory 504 and the storage 510 may include various forms of volatile or non-volatile storage media. For example, the memory 504 may include a read-only memory (ROM) 508 and a random access memory (RAM) 506, and the storage may include a Hard Disk Drive (HDD), a Solid State Drive (SSD), or the like.

Figure 6:
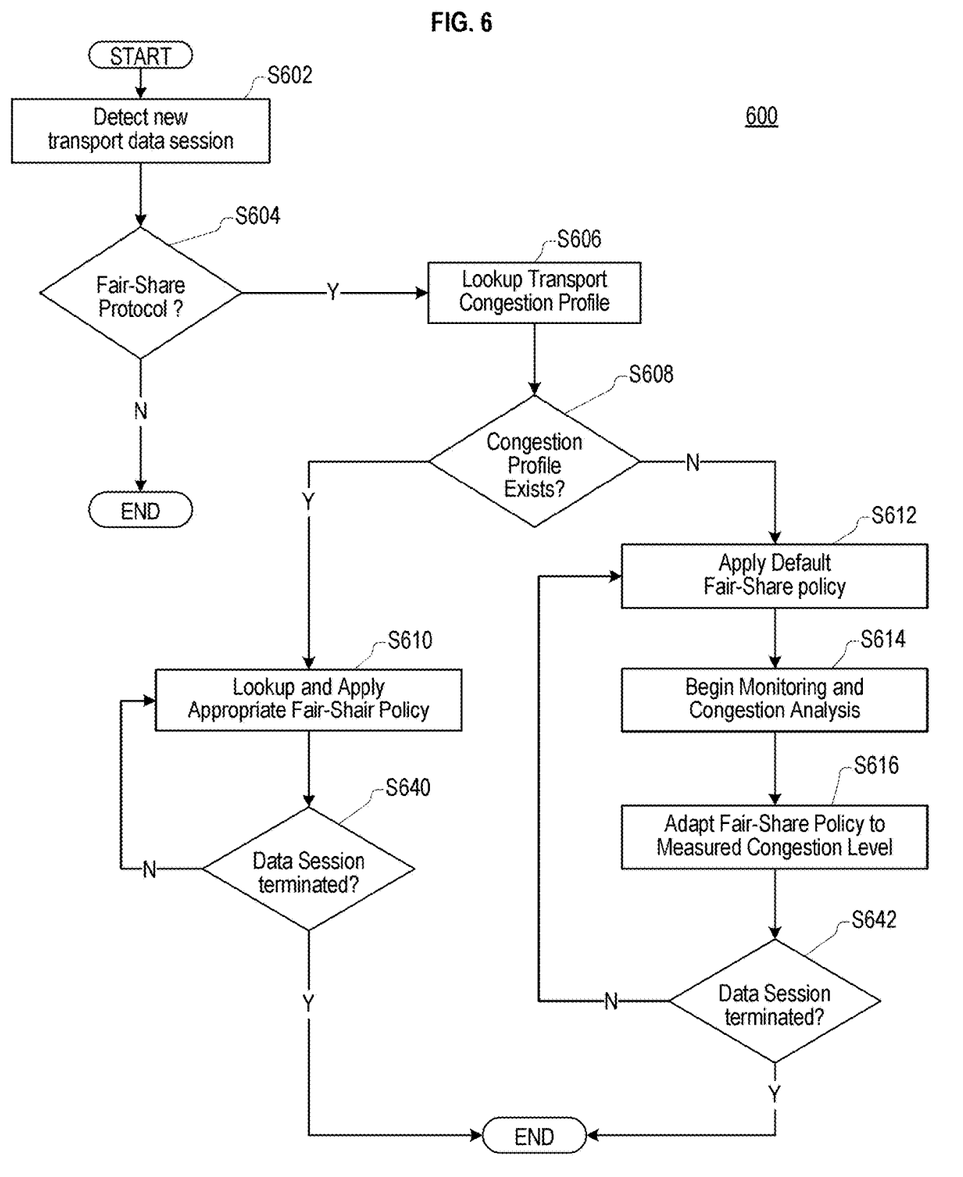
FIG. 6 illustrates a process using congestion information for transport optimization according to an embodiment.

FIG. 6 illustrates a process 600 using congestion information for transport optimization according to an embodiment. The process 600 may be performed in a transport optimization system, such as the transport optimization system 400 of FIG. 4, and in particular by a traffic manager in such a system. The process 600 implements congestion aware fair-share bandwidth control using a transport congestion profile lookup. Embodiments of the transport optimization process 312 of FIG. 3 may include the process 600.

At S602, the process 600 detects a new data transport session. The data transport session may be, for example, a TCP session initiated by a user device (such as the UE 414 of FIG. 4) and connecting the user device to a server (such as the server 406 of FIG. 4). However, embodiments are not limited thereto.

The process 600 may detect the new data transport session by monitoring transport-level packets. For example, the process 600 may detect a new TCP data transport session by detecting a TCP "three-way handshake" consisting of SYN, SYN+ACK, and ACK messages. In the case of a TCP data transport session, the process 600 may determine whether a message is associated with the data transport session using the source and destination addresses in the IP header of the message and the source and destination ports in the TCP header of the message.

The process 600 may also detect, for example, UDP and QUIC data transport sessions, and the like. In embodiments, the process 600 may detect data transport sessions of any Transport layer protocol.

At S604, the process 600 determines whether the detected data transport session is of a fair-share protocol. For example, TCP and QUIC are fair-share protocols, and UDP is not a fair share protocol. When the detected data transport session is not a fair-share protocol, at S604 the process 600 exits; otherwise, the process 600 proceeds to S606.

At S606, the process 600 performs a lookup to determine whether there is a transport congestion profile applicable to the data transport session. The process 600 may perform the lookup for a transport congestion profile of a particular subnetwork (such as the RAN 410 of FIG. 4, or one of the RANs 104A and 104B and the IAN 106 of FIG. 1) of which an endpoint of the data transport session is a member.

For example, when the UE 414 of FIG. 4 is an endpoint of the data transport session, the process 600 may look up and select a transport congestion profile in a database of transport congestion profiles for the RAN 410 of FIG. 4 that the user equipment 414 is a member of. In another example, when the network device 134A of FIG. 1 is an endpoint of the data transport session, the process 600 may look up and select a transport congestion profile in a database of transport congestion profiles for the IAN 106 of FIG. 1.

At S608, when an applicable transport congestion protocol is found at S606, the process 600 proceeds to S610; otherwise, the process 600 proceeds to S612.

At S610, the process 600 looks up and selects the appropriate fair-share policy applicable to the data transport session and, using the output of the transport congestion protocol selected at S606, apply the fair-share policy to the data transport session. The process 600 then proceeds to S640.

Applying the fair-share policy may include controlling a bandwidth used by the data transport session by in-band or out-of-band signaling. For example, the process 600 may control the bandwidth of the data transport session by modify a TCP data packet of the data transport session by setting ECN bits of the TCP packet to '11,' as shown in FIG. 4. In another example, the process 600 may control the bandwidth of the data transport session by modifying an ACK message of the data transport session by setting am ECN Echo bit of the ACK message to '1.'

The process 600 takes advantage of the additional information available to it, compared to congestion management solutions of the related arts. As a result, some indications that would be considered indications of congestion by solutions of the related arts may not be considered indications of congestion by the process 600, and some indications that the solutions of the related arts have no awareness of may be considered indications of congestion by the process 600. The process 600 may therefore perform congestion-related adjustments dynamically in real time based on current conditions in the network.

For example, when a packet latency of a RAN increases from 16 ms to 90 ms because of temporary interference, a congestion management solution of the related arts may consider that congestion and adjust its congestion window accordingly. In contrast, in an embodiment of the process 600, an increase in latency caused by temporary interference would not necessarily be considered an indication of congestion, and would therefore not necessarily cause an adjustment to a congestion window, but an increase in latency associated with an increase in a number of simultaneous users (and therefore an increase in the amount of data being transmitted) would be considered an indication of congestion, and could cause an adjustment of one or more congestion windows. In this way, the process 600 distinguishes between variations in performance indications that are acceptable normal variations and not due to congestion, and variations in performance indications and in combinations of performance indications that reliably indicate congestion.

At S612, in response to no transport congestion profile being found at S608, the process 600 creates a transport congestion profile based on a default fair-share policy. The process 600 may then store the created transport congestion profile in an appropriate database. For example, when a data transport session has a user device in a RAN as an endpoint, the process 600 may store the created transport congestion profile in a database of transport congestion profiles for the RAN.

At S614, the process 600 begins monitoring traffic related to the created transport congestion profile, and performing congestion analysis to determine a pertinent congestion level.

At S616, the process 600 adapts the created transport congestion profile according to the congestion level determined at S614. Typically, no two sessions are identical because there are many variables that impact a single transport session. Accordingly, the appropriate congestion profile needs to be adopted for each transport session based on information about the larger transport network and the information measured about each session. For example, two sessions on the same eNodeB cell site can have two different TCP congestion profiles due to their signal strength to the cell site. That is, each of these sessions will be provided with different congestion profiles that are adopted to its own conditions even though the two sessions are on the same cell site. The process 600 then proceeds to S642.

At S640, the process 600 determines whether the data transport session has been terminated. When the data transport session has been terminated, the process 600 ends; otherwise the process 600 proceeds to S610.

At S642, the process 600 determines whether the data transport session has been terminated. When the data transport session has been terminated, the process 600 ends; otherwise the process 600 proceeds to S612. In an embodiment, when a session ends (e.g., at S640 or S642), the congestion profile of that session is added to database for use by subsequent sessions.

Figure 7:
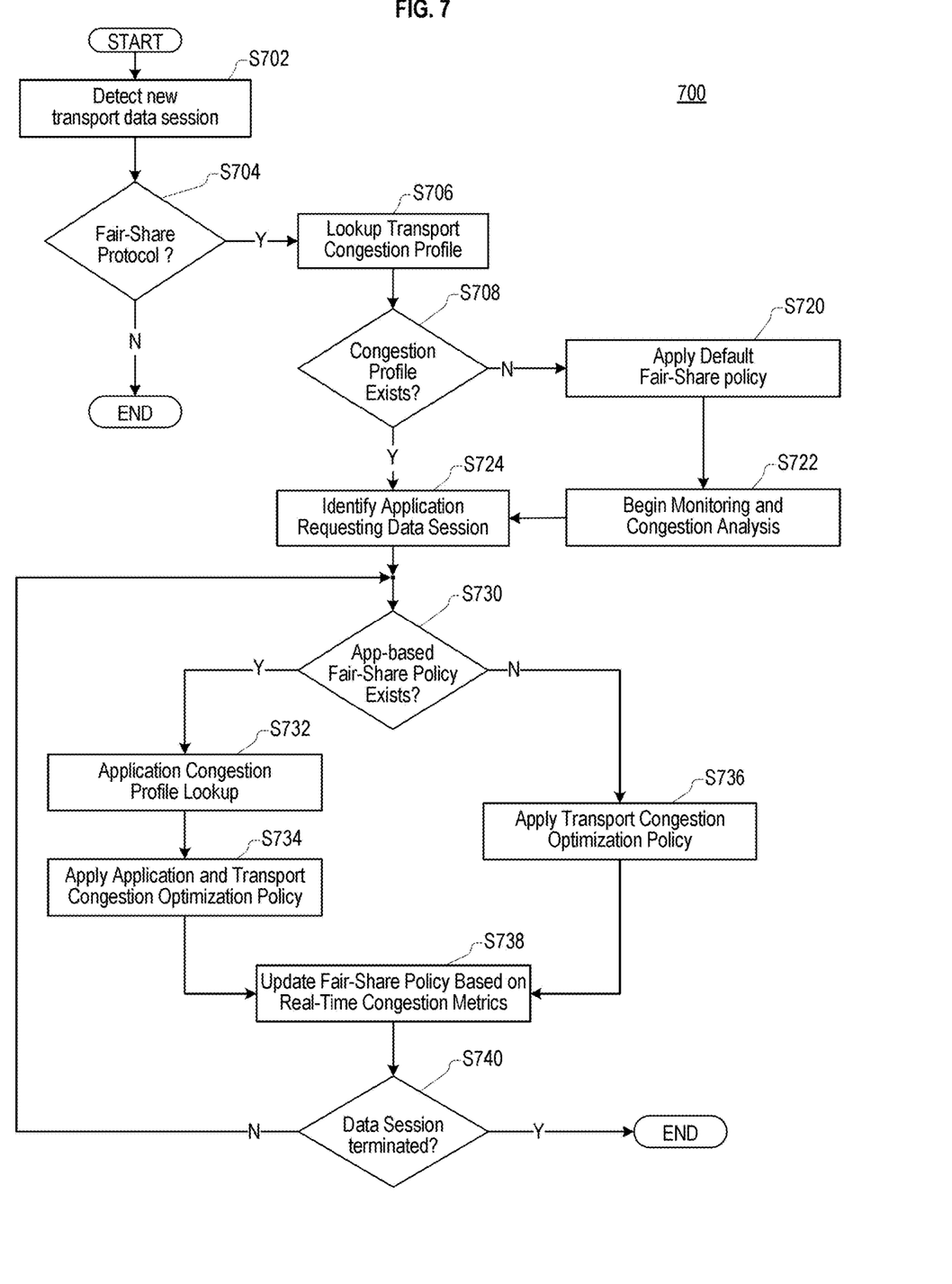
FIG. 7 illustrates a process using congestion information for transport optimization according to another embodiment

FIG. 7 illustrates a process 700 using congestion information for transport optimization according to another embodiment. The process 700 is both application and transport network congestion aware; that is, when managing a data transport session, it considers both the current level of congestion in the network being traversed by the data transport session and the application using the data transport session. Embodiments of the transport optimization process 312 of FIG. 3 may include the process 600.

The process 700 may implement fair-share policies based on both transport network congestion level and the requesting application. For example, if a transport session was established by a YouTube® application using the QUIC protocol, the process 700 could determine the appropriate transmit rate based on application specific requirements and KPIs as well as the transport network's congestion level. If the YouTube QUIC data session traversed a congested network, the process 700 may initially allow faster throughput for the YouTube QUIC data session knowing that video applications like YouTube rely on fast time to first frame to reduce initial buffering time. Then after a certain time or amount of data has been delivered to the application, the process 700 may reduce the data rate of the YouTube QUIC data session to allow other application types to have priority for the channel resources, again relying on the knowledge that video applications like YouTube operate as buffered systems that can tolerate fluctuation in transport network performance without negative impact to the video application.

In an embodiment, the process 700 may prioritize one or more sessions associated with the same network (e.g., the same cell site) based on certain characteristics of these sessions. For example, if there are a plurality of sessions over the same cell site, then the process 700 may temporarily reduce the send rate of one or more of the flows that have been transmitting for an extended duration in order to accelerate the flows of sessions that have been transmitting for less time, or less bytes, or both. This could allow these accelerated sessions to finish their transmission more quickly and reduce contention for the network resources at the cell site, thereby increase the available network resources to the larger more persistent sessions. In an implementation, the process 700 prioritizes the one or more sessions for accelerated flows if the plurality of the sessions is causing network transmission delay over the same cell site due to cross-traffic contention.

In an embodiment, the process 700 may determine the kind of application from the IP address of an endpoint of the data transport session. For example, a data transport session having an IP address associated with a YouTube® video server as an endpoint may be considered to be carrying data for an on-demand video application, while a data transport session having an IP address associated with a World of Warcraft® server as an endpoint may be considered to be carrying data for an online real-time game application.

The actions performed by the process 700 at S702, S704, and S706 correspond to the actions performed by the process 600 at S702, S704, and S706, and descriptions thereof will therefore be omitted for brevity.

At S706, the process 700 performs a lookup to determine whether there is a transport congestion profile applicable to the data transport session. The process 700 may perform the lookup for a transport congestion profile of a particular subnetwork of which an endpoint of the data transport session is a member, as described for S606 of FIG. 6.

As S708, when an applicable transport congestion protocol is found at S706, at S708 the process 700 proceeds to S724; otherwise, at S708 the process 700 proceeds to S720.

At S720, the process 700, in response to no transport congestion profile being found at S708, the process 700 creates a transport congestion profile based on a default fair-share policy. The process 700 may then store the created transport congestion profile in an appropriate database. For example, when a data transport session has a user device in a RAN as an endpoint, the process 700 may store the created transport congestion profile in a database of transport congestion profiles for the RAN.

At S722, the process 700 begins monitoring traffic related to the created transport congestion profile, and performing congestion analysis to determine a pertinent congestion level. In an embodiment, S722 is performed for a session where a congestion policy is not already known in advance. The characteristics of the session is measured to determine its the congestion level and decide on an appropriate action to reduce the congestion level.

At S724, the process 700 identifies an application responsible for the data transport session. The process 700 may identify the application by, for example, performing a reverse Domain Name Service (DNS) lookup on an IP address of an endpoint of the data transport session, by examining the contents of the data carried in the data transport session, or by recognizing a known pattern of behavior of an application.

At S730, the process 700 determines whether an application specific fair-share policy exists for the application identified at S724. If no application was identified at S724, the process 700 determines that an application-specific fair-share policy does not exist for the data transport session. If an application was identified at S724, the process 700 checks a database of application-specific fair-share policies to determine whether one exists for the determined application.

In an embodiment, the database of application-specific fair-share policies may be specific to a subnetwork or type of subnetwork; for example, a first database of such polices may exist for RANs, and a second database of such polices may exist for cable IANs. The database used may be determined by a type of a subnetworks carrying the data transport session or associated with an endpoint of the data transport session.

When the process 700 determines that an application-specific fair-share policy does not exist for the data transport session, as S730 the process 700 proceeds to S736; otherwise the process 700 proceeds to S732.

At S732, the process 700 looks up an application congestion profile corresponding to the application identified at S724.

At S734, the process 700, the process 700 looks up and selects the appropriate fair-share policy applicable to the application determined at S724 and, using the output of the transport congestion protocol selected at S706, apply the fair-share policy to the data transport session. The process 700 then proceeds to S738.

At S736, the process 700 looks up and selects the appropriate fair-share policy applicable to the data transport session and, using the output of the transport congestion protocol selected at S706, apply the fair-share policy to the data transport session. The process 700 then proceeds to S738.

At S738, the process 700 updates the transport congestion profile based on real-time congestion metrics since network conditions are continually changing, and thus the congestion profile needs to be updated based on information from new flows on the same network.

At S740, the process 700 determines whether the data transport session has been terminated. When the data transport session has been terminated, as S740 the process 700 ends; otherwise the process 700 proceeds to S730.

Embodiments may be implemented as a computer implemented method or as a non-transitory computer readable medium with computer executable instructions stored thereon. In an embodiment, when executed by the processor, the computer readable instructions may perform a method according to at least one aspect of the present disclosure.

In various embodiments of the present disclosure, data transport is optimized in the presence of potential congestion by a transport optimization process using one or more dynamic variables that are updated in real time to adapt to a current state of a network. The network may include a plurality of subnetworks each having distinct characteristics, which the transport optimization process may take into account. Furthermore, the transport optimization process may use information from the subnetworks that relates the unique characteristics of the subnetworks and in particular how congestion affects and may be detected on each subnetwork. The subnetworks may include Radio Access Networks (RANs), cable Internet Access networks (IANs), Digital Subscriber Line (DSL) IANs, fiber IANs, and the like.

The transport optimization process may provide inputs to a TCP implementation to control a congestion window of a TCP session in order to increase the bandwidth (i.e., accelerate) or decrease the bandwidth (i.e. decelerate) the TCP session.

While several embodiments of the present disclosure have been illustrated and described herein, many changes can be made without departing from the spirit and scope of the invention. For example, it can be appreciated that the disclosure may be used in wireless networks, wired networks, fiber networks and coaxial networks alone, or in combination. Accordingly, the scope of the invention is not limited by any disclosed embodiment.

What is claimed is:

1. A method performed by a computing device in a data transport network, the method comprising:

receiving, by the computing device, congestion-related information corresponding to current conditions of a portion of the network;

determining, by the computing device, whether a data transport session has a fair-share transport protocol, the data transport session having a first endpoint and a second endpoint, and the endpoints of the data transport session not including the computing device; and in response to determining that the data transport session has the fair-share transport protocol:

selecting, according to a type of a subnetwork including the first endpoint, a data base from among a plurality of databases, the subnetwork including a plurality of networked devices and being a physical Radio Access Network (RAN), a physical Internet Access Network (IAN), or both;

determining, by the computing device, a congestion policy for the data transport session by selecting, according to an identifier of a networked device including the first endpoint, according to an identifier of a networked device including the second endpoint, or according to the subnetwork, the congestion policy from among a plurality of transport congestion profiles included in the selected database, and applying, by the computing device and using the congestion-related information, the congestion policy to the data transport session.

2. The method of claim 1, wherein determining the congestion policy for the data transport session comprises determining the congestion policy according to a transport level protocol of the data transport session.

3. The method of claim 1, wherein determining the congestion policy for the data transport session comprises selecting the congestion policy from among the plurality of transport congestion profiles according to the identifier of the networked device.

4. The method of claim 1, wherein determining the congestion policy for the data transport session comprises selecting the congestion policy from among the plurality of transport congestion profiles according to the subnetwork.

5. The method of claim 1, wherein applying the congestion policy to the data transport session comprises providing an indication of congestion to the first endpoint or to the second endpoint.

6. The method of claim 5, wherein the indication is to adjust a congestion window of the data transport session.

7. The method of claim 5, wherein providing the indication of congestion to the first endpoint or to the second endpoint is performed by altering one or more bits in a Transport layer header of a message of the data transport session.

8. The method of claim 1, wherein receiving, by the computing device, the congestion-related information comprises:

receiving, by the computing device, congestion-related information from a network node, wherein the computing device is outside the path carrying the data transport session, and performs the method by communicating with devices in the data transport network that are in the path carrying the data transport session.

9. The method of claim 8, wherein the network node is a base station of a Radio Access Network (RAN) being used to communicate the transport data session, wherein the congestion-related information includes one or more of information selected from the group consisting of throughput information, jitter information, number of competing concurrent flows information, real-time throughput information for one or more users of the RAN, information on a delay due to excess resource demand, and priority information regarding a data transport session of the RAN.

10. The method of claim 1, wherein the data transport session is one of a plurality of session in a same network, and wherein the congestion policy includes prioritizing the data transport session if the data transport session has been transmitting for less time, or transmitted less bytes, or both, than one of the other sessions in the same network.

11. The method of claim 10, wherein the congestion policy prioritizing the data transport session is implemented when the computing device detects a network transmission delay over the same network due to cross-traffic contention from the plurality of sessions.

12. A system, comprising:
a memory storing non-transitory program commands; and
a processor,
wherein, when the processor executes the program commands, the processor:

receives congestion-related information corresponding to current conditions of a portion of the network;

determines whether a data transport session has a fair-share transport protocol, the data transport session having a first endpoint and a second endpoint, and the endpoints of the data transport session not including the processor; and in response to determining that the data transport session has the fair-share transport protocol:

selects, according to a type of a subnetwork including the first endpoint, a database from among a plurality of databases, the subnetwork including a plurality of networked devices and being a physical Radio Access Network (RAN), a physical Internet Access Network (IAN), or both;

determines, according to an identifier of a networked device including the first endpoint, according to an identifier of a networked device including the second endpoint, or according to the subnetwork, a congestion policy for the data transport session by selecting the congestion policy from among a plurality of transport congestion profiles included in the selected database, and applies, using the congestion-related information, the congestion policy to the data transport session.

13. The system of claim 12, wherein determining the congestion policy for the data transport session comprises determining the congestion policy according to a transport level protocol of the data transport session.

14. The system of claim 12, wherein determining the congestion policy for the data transport session comprises determining the congestion policy according to the identifier of the networked device.

15. The system of claim 12, wherein determining the congestion policy for the data transport session comprises selecting the congestion policy from among the plurality of transport congestion profiles according to the subnetwork.

16. The system of claim 12, wherein applying the congestion policy to the data transport session comprises providing an indication of congestion to the first endpoint or to the second endpoint.

17. The system of claim 16, wherein the indication is to adjust a congestion window of the data transport session.

18. The system of claim 16, wherein providing the indication of congestion to the first endpoint or to the second endpoint is performed by altering one or more bits in a Transport layer header of a message of the data transport session.

19. The system of claim 12, wherein the congestion-related information is received from a base station of a Radio Access Network (RAN) being used to communicate the transport data session, and wherein the congestion-related information includes one or more of information selected from the group consisting of throughput information, jitter information, number of competing concurrent flows information, real-time throughput information for one or more users of the RAN, information on a delay due to excess resource demand, and priority information regarding a data transport session of the RAN.

* * * * *